(12) United States Patent
Siefke et al.

(10) Patent No.: US 7,374,086 B2
(45) Date of Patent: May 20, 2008

(54) PROTECTION OF ITEMS WITHIN STORES

(75) Inventors: Wolfram Siefke, Heidelberg (DE); Jens Staeck, Sandhausen (DE)

(73) Assignee: SAP Aktiengesellschaft, Walldorf (DE)

( * ) Notice: Subject to any disclaimer, the term of this patent is extended or adjusted under 35 U.S.C. 154(b) by 559 days.

(21) Appl. No.: 10/880,539

(22) Filed: Jul. 1, 2004

(65) Prior Publication Data

US 2006/0004635 A1   Jan. 5, 2006

(51) Int. Cl.
  *G06K 15/00* (2006.01)
(52) U.S. Cl. ............................ 235/383; 235/385; 705/5
(58) Field of Classification Search ............... 235/383, 235/385; 705/5
See application file for complete search history.

(56) References Cited

U.S. PATENT DOCUMENTS

| | | | | |
|---|---|---|---|---|
| 6,747,560 | B2 * | 6/2004 | Stevens, III | ................ 235/385 |
| 2002/0040927 | A1 | 4/2002 | Davis | |
| 2003/0004761 | A1 * | 1/2003 | Lampe et al. | .................. 705/5 |
| 2004/0000997 | A1 | 1/2004 | Stevens | |
| 2006/0169776 | A1 * | 8/2006 | Hornbaker et al. | ......... 235/385 |

OTHER PUBLICATIONS

International Search Report for corresponding European Application EP04015535 mailed Nov. 4, 2004.

* cited by examiner

*Primary Examiner*—Michael G. Lee
*Assistant Examiner*—Allyson N. Trail
(74) *Attorney, Agent, or Firm*—Fish & Richardson P.C.

(57) ABSTRACT

Methods, systems, and computer programs are described for detecting items within stores that are not intended for sale, so as to prevent a sale or re-sale of those items. The items are marked with identifiers, such as smart tags. Each of the items may be registered as being sold, perhaps within a data record associated with the item and the identifier, when the items are sold. As a result, the data record may later be checked, prior to a potential re-selling of the item, in order to prevent maliciously manipulated items from being sold or re-sold. Similarly, if there is no correspondence between an item's detected identifier, if any, and one of the data records, then the item may be prevented from being sold or re-sold. An alarm signal may be provided if such a prevented sale is detected.

31 Claims, 8 Drawing Sheets

PROTECTION OF ITEMS WITHIN STORES

TECHNICAL FIELD

This description relates to tracking items for sale.

BACKGROUND

It is known that items of retail and wholesale stores may be identified using unique identifiers. These unique identifiers may include, for instance, radio frequency identification (RFID) tags. These RFID tags may be attached to each of the items. On the RFID tags, a unique identification, such as a unique number, may be stored. This number may be interrogated from the unique identifier for taking inventory of the store. The unique identifiers may also be used during purchase of items from the stores. At the checkout desk, the unique identification may be read from the unique identifier and a corresponding price may be provided. This enables a cashier to scan the items quickly and to calculate the price of all items automatically.

To update the inventory of the store, it is also known in the art that if an item is actually sold, this item may be deleted from the list of the items on stock. This may be done, for instance, by using the unique identification, which may be stored in a database. When the item is sold, the database is updated, such that, for instance, the unique identification may be deleted completely from the database. Such items may include, for instance, goods, products, devices, foods, or any other items that may be sold in a store.

However, a technical problem of retail stores, convenience stores, restaurants, wholesale stores or any other stores may be that they do not know whether an item has previously been sold, or, if the item has previously been sold, whether it is allowed to be sold again. For example, a customer may return a previously-purchased item for credit. As another example, a customer may sneak an item into a store and improperly place it for sale.

In particular, maliciously modified items may be brought to a store undiscovered, to be used for blackmailing the store. Manipulated items may be items that have been bought or stolen from the same store, or from somewhere else. For instance, food may be manipulated with poison, and then brought back to the store and placed on the shelves. A customer may not detect the manipulation and may buy this item. There is no technical implementation that prevents items that are not intended to be sold from being taken from the store.

In the example just given, a customer would buy poisoned food. As a result, the store may be sued by the customer, even though the store is not responsible for the poisoning of the customer. Moreover, the original producer of the food item may suffer as well, as its brand or image may be damaged in the marketplace (for example, by negative publicity surrounding the sale of the poisoned food item).

A related technical problem may be that items, which, for example, have been returned or brought unauthorized into a store, need to be detected. It may be necessary to prevent these items from being sold.

SUMMARY

To overcome these problems, the invention provides a method for detecting items within stores, which are not intended for sale, by determining data records that individually correspond to each of the items, each data record storing a status of its corresponding item, the status reflecting an in-stock condition when its corresponding item is ready for sale. The data record of each item is checked, prior to selling each item, to thereby output an alarm signal when the data record is missing or otherwise does not reflect the in-stock condition, and the data records are modified to indicate a sold status for each of the items, as each item is sold.

In checking the data records, it may be checked whether a) the items carry a unique identifier correctly associated with a corresponding data record, or b) the items have not been registered as sold. In this way, an alarm signal may be provided if at least one of the conditions a) or b) is false.

By using, for example, a high frequency interrogator, such as, for instance, a transmitter, which may be able to interrogate wirelessly accessible unique identifiers, such as, for example, transponders or RFID tags, it may be checked prior to selling the items whether a unique identifier is attached to the items. When interrogating the unique identifier, it may also be possible to check whether this item has been registered as (previously) sold.

If one of these conditions is not complied with, it may be possible to provide an alarm signal. Thus, it may be possible to prevent selling items that do not carry a unique identifier at all, or items that carry an identifier with no match to one of the stored data records. These items may be items that have been brought to the store from somewhere else.

By checking whether the items are registered as sold, it may be possible to prevent items, which have once been sold, from being re-sold. No items may be brought out of the store unless they have a unique identifier and have been registered as sold. Transmitters for interrogating transponders at the exit of the store, or at the checkout desks, may be responsible for interrogating the identifiers of the items. Since every item may carry a tag with an individual identifier, it may be possible to check every individual item.

For instance, an item with the status "sold" is brought back into the store by fraud. In case such an item appears at the cash desk, it may be detected that this item already has been sold, and an alarm signal may be provided. For instance, if an item without a unique identifier is brought back into the store by fraud, this item may be detected at the checkout desk again. This may indicate that this item is not intended for sale, and the alarm signal may also be provided.

The alarm signal may be any signal that may cause the item from being sold. This may be an acoustical or optical signal. For example, the alarm signal may be sent to a door opener, which prevents the door from being opened. Any other possible alarm signal may also be provided.

According to some implementations, each of the items may be registered within its corresponding data record as being delivered to the store during delivery of the items to a store. For example, all of the items that are brought to the store intentionally by the store may be registered as "in stock."

According to some implementations, it may be checked whether items are registered as being delivered to the particular store, for instance "in stock," and providing an alarm signal if at least one of the required conditions is false. Thus, it may be possible not only to detect all items which do not have a unique identifier, or which already have been registered as sold, but also items which were not brought into the store intentionally.

At the receiving department of a store, the unique identifiers may be interrogated and the respective items may be registered as being "in stock." If this status is also checked before selling the items, then only items that have been received by the receiving department may be sold.

For instance, a checkout desk transmitter may monitor a buying process. This transmitter may check whether the items carry a unique identifier, whether the items have not been previously registered as sold, and/or whether the items are registered as being delivered to the particular store. This checking at the checkout desk provides, for example, that the items are only sold if they are intended to be sold.

According to some implementations, it may also be possible that once the items are brought outside the store, they are registered as being outside the store. This may, for example, be done at the exit of the store. For instance, a transmitter at the exit registers the status of the item as "outside." This may document that the item has definitively left the store. Simultaneously, for instance, an additional theft-protection may be performed. This may be done by checking whether the item has the status "in stock," and not whether the item is not being registered as "sold." Therefore, it may be determined whether this item is stolen.

A malicious return of items may be avoided, for example, by checking at a shop entrance whether items registered as being "sold" and/or being "outside" the store are brought back into the store. In either of these cases, the items brought back to the store may already have been sold. Selling such items again should be prevented. An alarm signal may be generated if either of these conditions is true. This alarm signal may cause actions necessary to prevent bringing the items back into the store. For example, a returns desk may need to be placed outside the monitored area, as otherwise returns of customers having legitimately purchased defective items would cause an alarm. However, items without a unique identifier or being bought at a different shop without being registered as "sold" or "outside," may not be detected. These items may be detected at the exit or the checkout desk.

For example, some implementations provide registering each of the items as being delivered to the store, as being sold, or as being outside the store. This may be done by writing the respective status, for example "in stock," "sold" or "outside," onto the unique identifier. The unique identifier may, for instance, be a smart tag. Inasmuch as such a smart tag allows writing data onto a memory area within the tag itself, implementations allow writing the status of the tag onto the tag itself. This may be done by transmitters, which are responsible for interrogating and writing data to and from the unique identifiers.

Implementations provide encryption for writing and/or reading data to and/or from the unique identifiers. By encrypting the data written and/or read to and/or from the unique identifiers, the respective data may be prevented from being manipulated. Fraudulent changes to the data of the unique identifiers may be detected, inasmuch as the data is encrypted, and writing non-encrypted data or data with the wrong encryption key may be detected. For encrypting the data, common encrypting algorithms may be used.

As the unique identifiers may carry unique identifications, implementations provide interrogating the unique identifications from the unique identifiers of the items. By that, it may be possible to identify each item uniquely. The unique identifications may be unique numbers.

Implementations provide registering each of the items as being delivered to the store, as being sold, and/or being outside the store. This may, for example, be done by storing the respective status together with the unique identification, for example the unique number, within a central database. Reading the status of an item from the central database, once the unique identification is known, may be possible.

Mapping between unique identification and their respective status may be provided by the central database. When checking whether an item is allowed to be sold, or when checking items brought back into the store, the central database may be queried. In such a case, the unique identification of the unique identifier may be sent to the central database, where the statuses of this unique identifier may be determined and delivered back to the requesting device.

Implementations provide determining from the central database whether the items have been registered as "sold," "in stock" and/or "outside" using the unique identification of the items. The unique identification may be determined from the unique identifiers attached to the respective items. By mapping the unique identification onto the respective status within the database, the statuses may be determined.

According to another aspect, a system is provided for detecting items within stores that are not intended for sale. A classifier is operable to determine data records that individually correspond to each of the items, each data record storing a status of its corresponding item, the status reflecting an in-stock condition when its corresponding item is ready for sale. An interrogator is operable to check the data record of each item, prior to selling each item, and a controller in communication with the interrogator is operable to output an alarm signal when the data record is missing or otherwise does not reflect the in-stock condition, and the controller is further operable to modify the data records to indicate a sold status for each of the items, as each item is sold.

The controller may check whether a) each of the items carries a unique identifier that is recognized as being associated with a corresponding data record, or b) each of the items has not previously been registered as sold within its corresponding data record, and is further operable to provide the alarm signal if at least one of the conditions a) or b) is false.

According to a further aspect, a computer program product for detecting items within stores that are not intended for sale is described. The product comprises a program stored thereon comprising instructions operable to cause a processor to determine data records that individually correspond to each of the items, each data record storing a status of its corresponding item, the status reflecting an in-stock condition when its corresponding item is ready for sale. The instructions further cause the processor to check the data record of each item, prior to selling each item, to thereby output an alarm signal when the data record is missing or otherwise does not reflect the in-stock condition, and to modify the data records to indicate a sold status for each of the items, as each item is sold.

The program further may comprise instructions to check whether a) each of the items carries a unique identifier that is recognized as being associated with a corresponding data record, or b) each of the items has not previously been registered as sold within its corresponding data record, and provide an alarm signal if at least one of the conditions a) or b) is false.

Referring now to the drawings, in which like numerals represent like elements throughout the several figures, aspects of the present invention and example operating environments are described.

DETAILED DESCRIPTION

In FIGS. 1 to 4, while reference numbers 100/200, 110/210 . . . denote similar elements, the function of these elements may be different.

Figure 1:
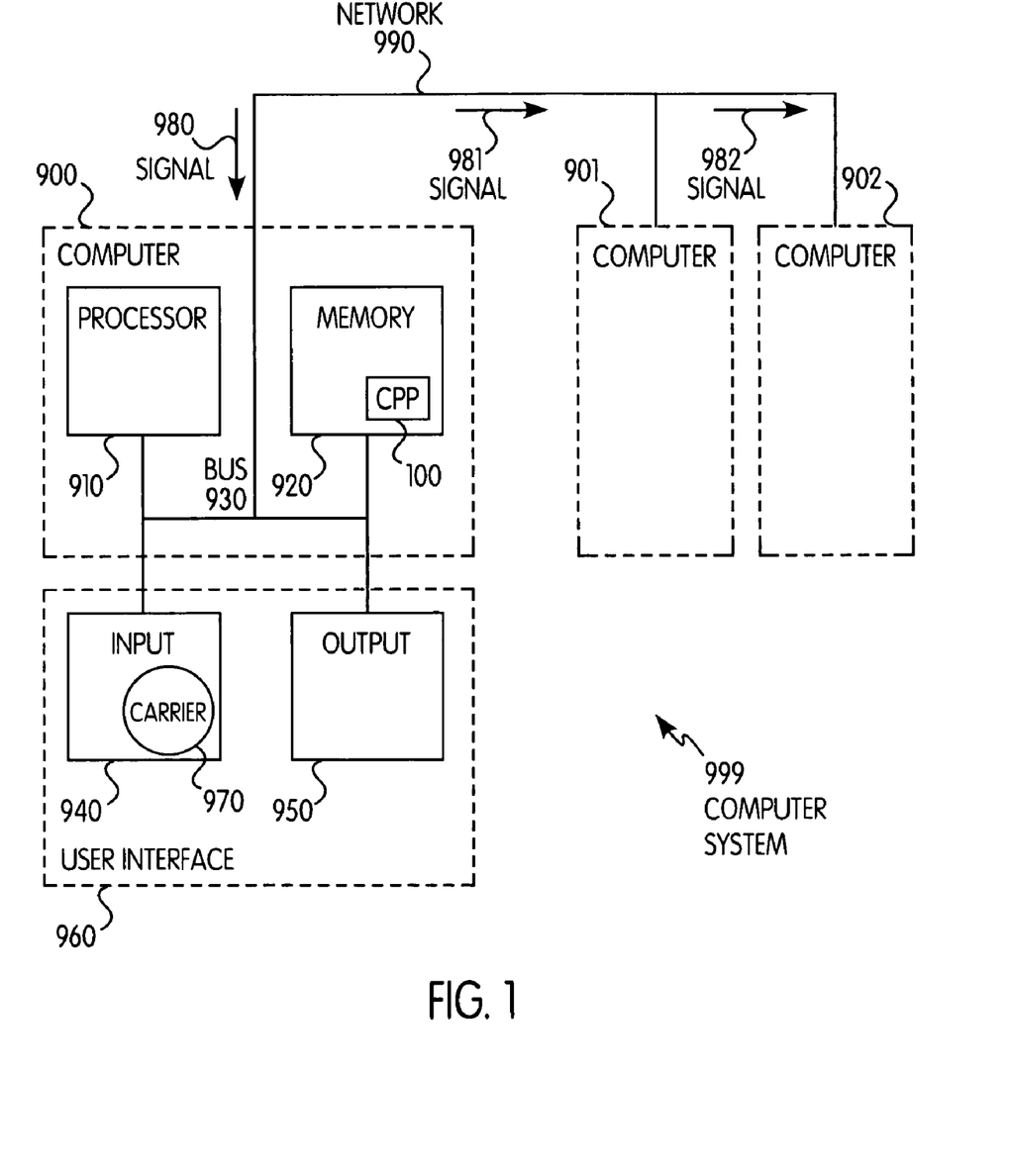
FIG. 1 is a block diagram of a computer system for protecting items within stores.

A computer system for protecting items within stores is illustrated in FIG. 1. FIG. 1 illustrates a simplified block diagram of a computer system 999 having a plurality of computers 900, 901, 902 (or even more).

Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program item 100 (CPP), carrier 970 and signal 980.

With respect to computer 900, computer 901/902 is sometimes referred to as a "remote computer", and computer 901/902 is, for example, a server, a peer device or other common network node, and typically has many or all of the elements described relative to computer 900

Computer 900 is, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 is comprised of elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be read-only memory (ROM), random access memory (RAM), or memory with other access options. Memory 920 is physically implemented by computer-readable media, for example: (a) magnetic media, like a hard disk, a floppy disk or other magnetic disk, a tape, or a cassette tape; (b) optical media, like optical disk (CD-ROM, digital versatile disk—DVD); or (c) semiconductor media, like DRAM, SRAM, EPROM, EEPROM, or a memory stick.

Optionally, memory 920 is distributed. Portions of memory 920 can be removable or non-removable. For reading from media and for writing in media, computer 900 uses well-known devices, for example, disk drives or tape drives.

Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and—optionally—data that cause processor 910 to execute method steps of the present invention. In other words, CPP 100 can control the operation of computer 900 and its interaction in network system 999 so that it operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an item of manufacture having a computer-readable medium with computer-readable program code to cause the computer to perform methods of the present invention. Further, signal 980 can also embody computer program item 100.

Having described CPP 100, carrier 970, and signal 980 in connection with computer 900 is convenient. Optionally, further carriers and further signals embody computer program items (CPP) to be executed by further processors in computers 901 and 902.

Input device 940 provides data and instructions for processing by computer 900. Device 940 can be, for instance, a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), or a counter (e.g., an items counter in a factory). Input device 940 can serve to read carrier 970.

Output device 950 presents instructions and data that have been processed. For example, this can be a monitor or a display, cathode ray tube (CRT), flat panel display, liquid crystal display (LCD), speaker, printer, plotter, or a vibration alert device. Output device 950 can communicate with the user, but it can also communicate with further computers.

Input device 940 and output device 950 can be combined to a single device. Any device 940 and 950 can be provided optionally.

Bus 930 and network 990 provide logical and physical connections by conveying instruction and data signals. While connections inside computer 900 are conveniently referred to as "bus 930," connections between computers 900-902 are referred to as "network 990." Optionally, network 990 includes gateways, which are computers that specialize in data transmission and protocol conversion.

Devices 940 and 950 are coupled to computer 900 by bus 930 (as illustrated) or by network 990 (optionally). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., the world wide web). Network 990 can be a wired or a wireless network. To name a few network implementations, network 990 can be, for example, a local area network (LAN), a wide area network (WAN), a public switched telephone network (PSTN); an Integrated Services Digital Network (ISDN), an infrared (IR) link, a radio link like Universal Mobile Telecommunications System (UMTS), Global System for Mobile Communication (GSM), Code Division Multiple Access (CDMA), or satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), and Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides," are convenient abbreviations to express actions by a computer that are controlled by a program.

The exemplary computer system may be incorporated into a system as shown in FIGS. 2a-e. Throughout the FIGS. 2a-e, a store 2 is shown. Further shown are items 4a, 4b, a store entrance 6, a checkout desk 8 and a receiving department 10.

Entrance 6, checkout desk 8, and receiving department 10 are located inside store 2. At the entrance 6, the checkout desk 8 and the receiving department 10, transmitters may be located (not depicted). These transmitters may allow interrogating data from RFID tags and may allow writing data onto the RFID tags. An arrangement according to FIGS. 2a-e allows implementing an inventive method.

Entrance 6, checkout desk 8 and receiving department 10 may be connected to a central database (not depicted). Both items 4a, 4b carry an RFID tag, which may, for instance, be a smart tag carrying data that may be manipulated wirelessly by sending data onto the RFID tag.

Figure 2A:
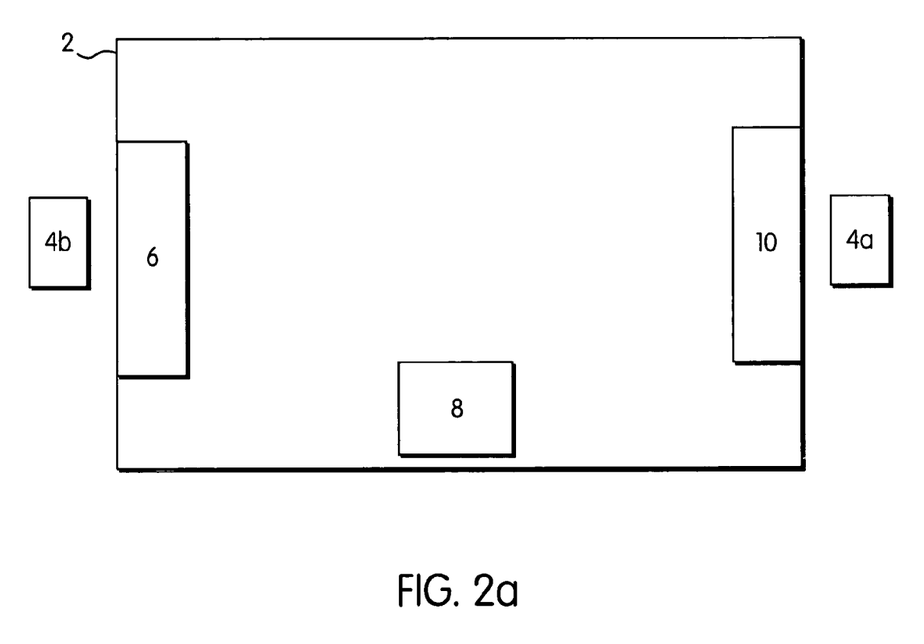
FIGS. 2a-e are block diagrams of different implementations using the computer system of FIG. 1.

When item 4a is delivered to store 2, it has to pass the receiving department 10. During delivery through receiving department 10, item 4a is marked with the status entry "in stock". All items 4a being marked with a status entry "in stock" are supposed to be in stock in the store and may be stored at self-service shelves within the store 2. Writing the status entry "in stock" onto the RFID tag of item 4a may be protected using standard authorization techniques. The data may also be encrypted.

A person who wants to blackmail the store, for example, might bring manipulated item 4b, which is not intended for sale, into the store 2 through entrance 6. The manipulated item 4b may not carry any RFID tag. At entrance 6 each person is checked, whether the person carries any items with a readable RFID tag. In case an item with a readable RFID tag is detected, its status entry may be interrogated from the RFID tag. In case items with a status entry "sold" or "outside" are brought into the store 2 through entrance 6, an alarm signal may be generated to prevent these items from being put back onto the shelves of the store 2.

However, items without an RFID tag or with an unreadable RFID tag may not be detected at entrance 6 and brought into the store 2. In the current example, this is the case for item 4b.

Figure 2B:
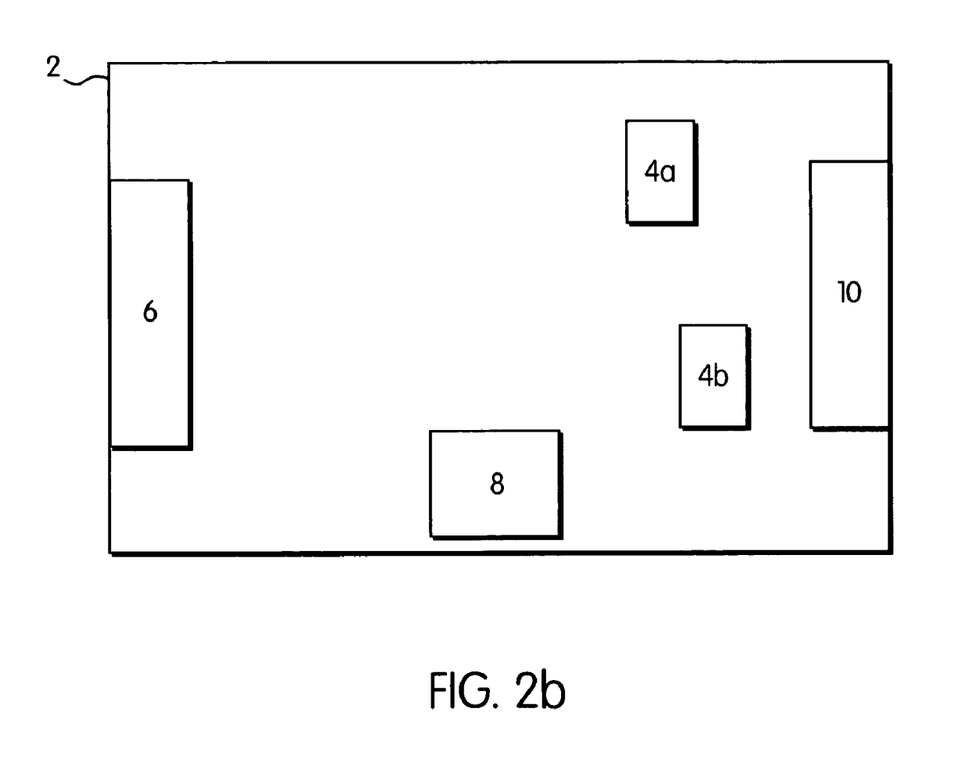

FIG. 2b shows the store 2, within which the items 4a and 4b are located. Item 4a may be intended for sale. Item 4b may not be intended for sale. Item 4b may, for instance, be a manipulated item. This item needs to be prevented from being sold. This may be done by checking that all items at the checkout desk have RFID tags with statuses indicating that sale of the items is allowed.

Figure 2C:
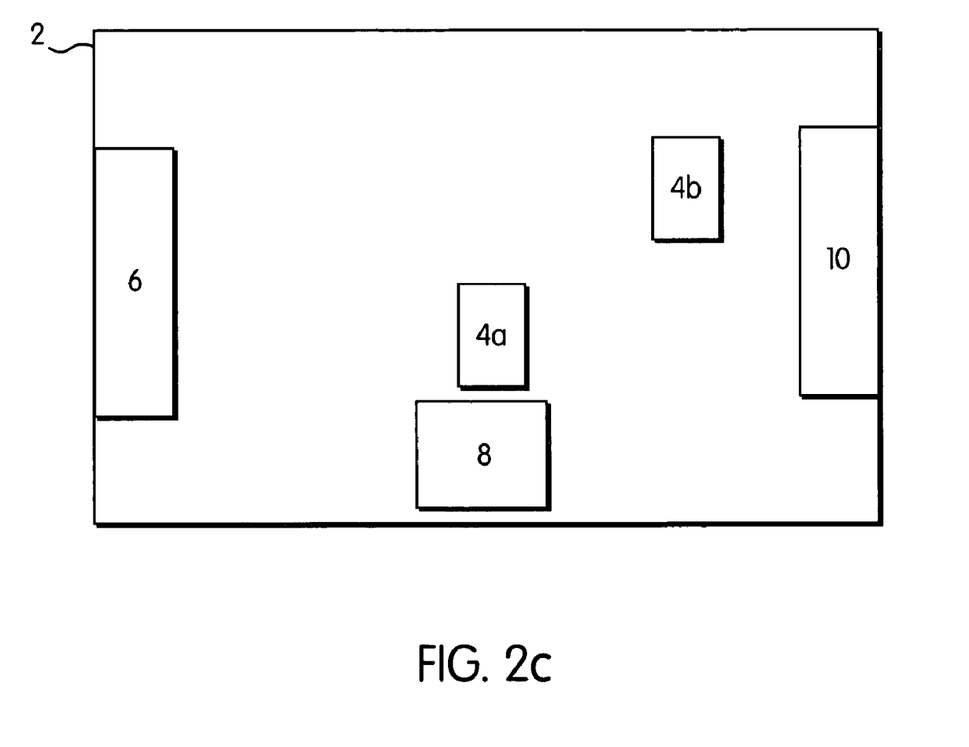

As depicted in FIG. 2c, the item 4a is intended to be sold. During the buying process, item 4a needs to pass the checkout desk 8. During the buying process, the transmitter located at checkout desk 8 interrogates RFID tag of item 4a. It may be checked whether item 4a carries a RFID tag. If item 4a carries a readable RFID tag, the status entry of this RFID tag may be interrogated. After interrogating the status entry of item 4a, it may be checked whether this status entry is "in stock." Further, it may be checked whether the status entry is not "sold" or "outside." If the item 4a carries a RFID tag and has a status entry "in stock," the item 4a is allowed to be sold. The transmitter located at checkout desk 8 committing the buying process may write a status entry "sold" onto the RFID tag of item 4a. Writing this status entry "sold" onto the RFID tag of item 4a, marks it as having been sold.

Items without an RFID tag, or without a status entry "in stock" may be detected, and an alarm signal may be generated.

Figure 2D:
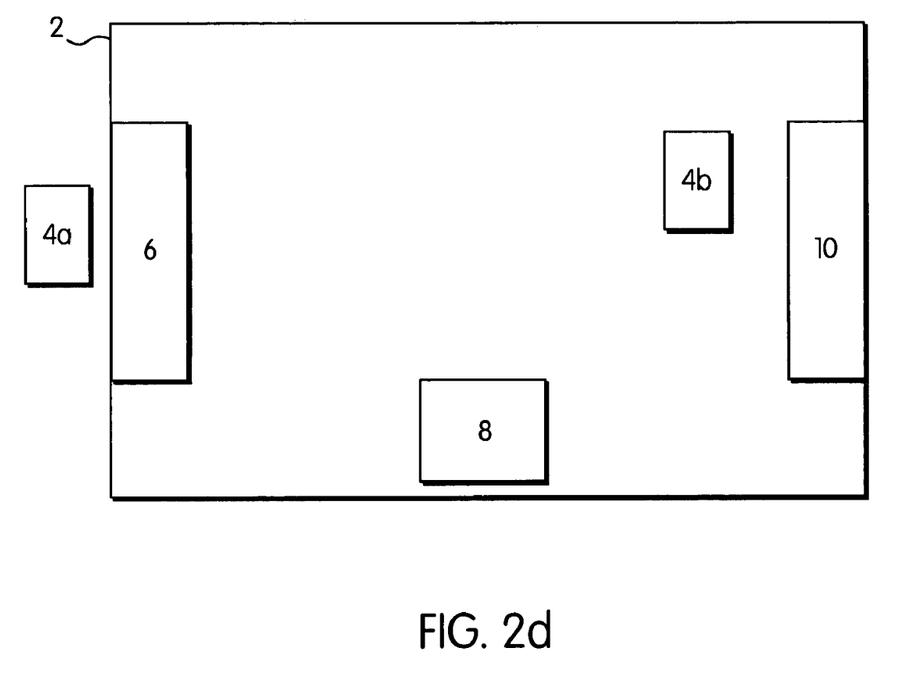

As depicted in FIG. 2d, after its purchase, item 4a passes entrance 6. The transmitter at entrance 6 may write the status entry "outside" onto the RFID tag of item 4a. Item 4a may thus be marked as already being outside the store 2. Bringing back this item 4a into the store 2 would cause an alarm signal at entrance 6, as the transmitter at entrance 6 may interrogate all RFID tags of items brought into store 2. Items carrying a status entry "outside" may cause the generation of the alarm signal.

Figure 2E:
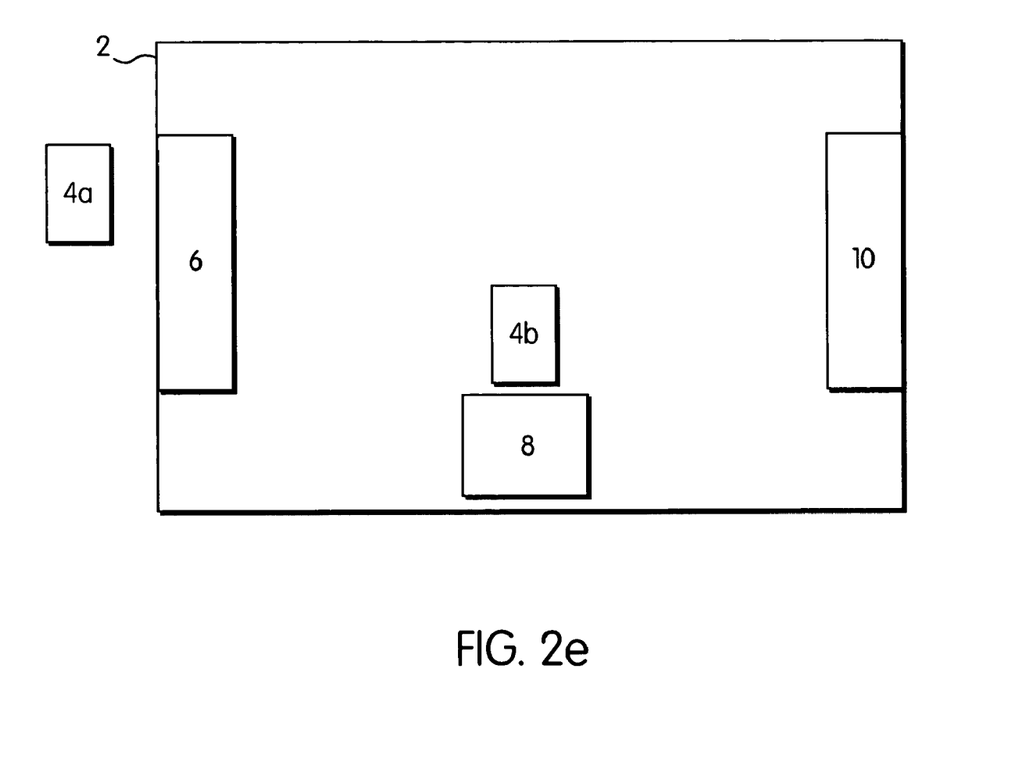

FIG. 2e shows a buying process of an item 4b, which is not intended for sale and does not carry an RFID tag. During the buying process the transmitter at cash desk 8 may interrogate whether item 4b carries an RFID tag. If the transmitter does not detect any readable RFID tag, the alarm signal may be generated.

For example, item 4b may carry an RFID tag. However, the status entry of this RFID tag may be "sold" or "outside." If either of these two status entries is read by the transmitter at checkout desk 8, an alarm signal may also be generated.

It may also be possible that during the delivery of an item 4a to store 2 through the receiving department 10 the unique identification of the RFID tag of item 4a is read and this unique identification together with a status of "in stock" may be stored within a central database (not depicted). When item 4a is sold, as shown in FIG. 2c, the transmitter at the checkout desk 8 may read the unique identification of the RFID tag of item 4a and determine its status from the central database. In case this status is "in stock," this item 4a is cleared for selling. Also, the status may be changed from "in stock" to "sold" within the central database.

When the item 4a is brought outside the store 2, as shown in FIG. 2d, the transmitter at entrance 6 may read the unique identification of the RFID tag of item 4a and may change the status of this RFID tag within the central database from "sold" to "outside."

If an item 4b carrying a RFID tag with a different status than "in stock" is brought to the checkout desk 8, the transmitter at checkout desk 8 may interrogate the unique identification of the RFID tag of item 4b. The unique identification may be used for determining from the central database the status of the item. In this case, the status may be determined to be not "in stock." In such a case, the buying process may be stopped by generating an alarm signal.

Figure 3:
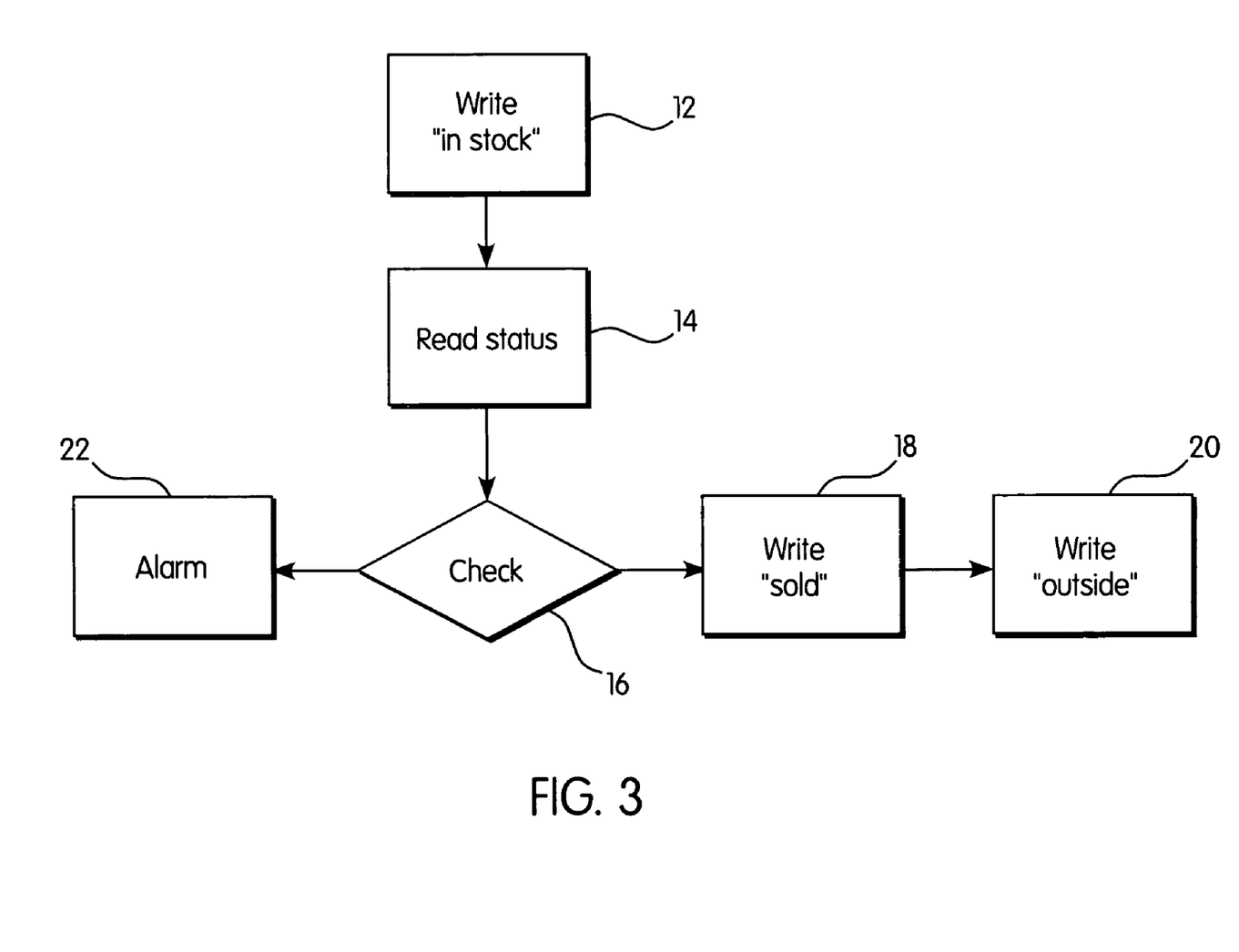
FIG. 3 is a first flowchart illustrating techniques used by the implementations of FIGS. 2a-e.

FIG. 3 is a flowchart illustrating techniques used in conjunction with the systems of FIGS. 1 and 2a-2e. If an item is delivered to a store, its status is registered as "in stock" (12). Once the item is brought to the checkout desk, the registered status of this item is determined (14). After determining the status, it may be checked (16) whether the status is "in stock" and not "sold" or not "outside." If the item carries a tag at all and all of these conditions are true, the buying process may be cleared. After clearance, the status of the item may be changed to "sold" (18). When the item leaves the store, the status of the item may be changed to "outside" (20).

In case during the check (16), an item is detected which has not the status "in stock," for instance, if it is registered as "sold" or "outside" or does not carry any tag at all, an alarm signal may be generated (22).

Figure 4:
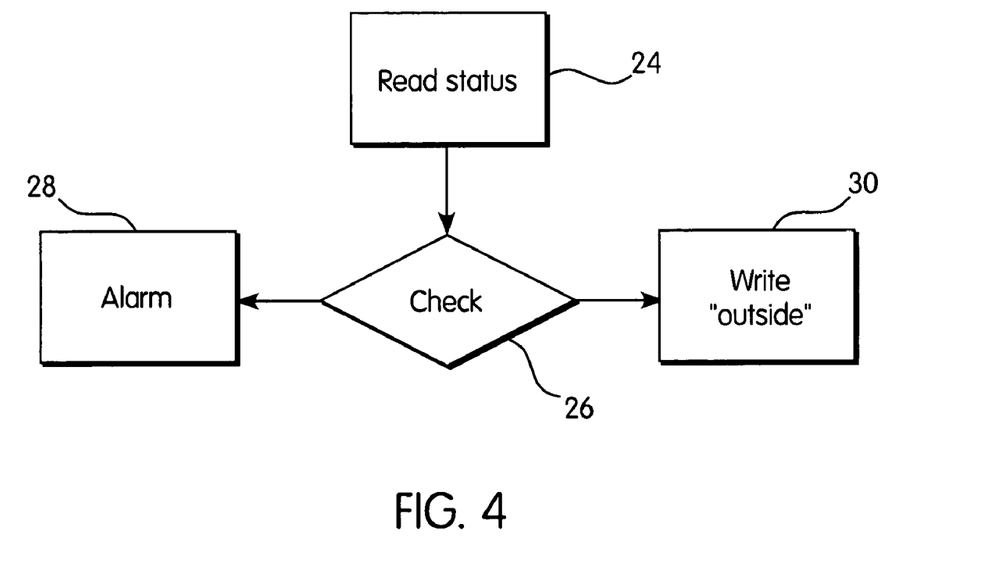
FIG. 4 is a second flowchart illustrating techniques used by the implementations of FIGS. 2a-e.

FIG. 4 is a flowchart illustrating techniques for checking items at the entrance of a store. At the entrance of the store, a transmitter may interrogate all RFID tags passing the entrance (24). After interrogating the status, this status may be checked (26). If a status read from an RFID tag is "outside," an alarm signal may be generated. These statuses may indicate that the item has already been outside the store and is not intended for sale. If a status read from an RFID tag is "in stock," again an alarm signal may be generated (28). Such a status may indicate that the items have not been purchased, as otherwise their status would have been registered as "sold" when cleared properly at the checkout desk.

In case a status is "sold," the status may be changed to "outside" (30) at the entrance. This allows identification of the item being brought back into the store.

Based on the above, it should be understood that registering a status of an item may refer to updating a data record associated with the item to reflect at least one of a pre-determined number of categories describing the item. For example, the data record may include the status information, "delivered," "in-stock," "delivered and in-stock," "sold," or "outside," or "sold and outside," to name a few. The data record also may include a unique identification number associated with a similarly-unique identifier of the item. The data record may be stored within the identifier, e.g., smart tag, and/or may be stored within a centralized database. A classifier may be used to associate the data records, along with their respective status and identification information, with associated items and their identifiers.

Using the data records, store owners may determine a status of an item, and, particularly, whether a given item is ready for sale. For example, it may be required that an item's data record include the status information "in-stock" before the item may be sold. As a result, if an item is checked and found to have an identifier that is not associated with any known data record, or to have not identifier at all, then the item may not be sold. As a result, items and identifiers from other stores will not be re-sold within the store. Similarly, even if an item is from the store, it will not be sold if it does not have a proper identifier.

If an identifier of an item is checked and the associated data record reveals a status of anything other than "in-stock" or some other acceptable status, then, again, the item may not be sold. For example, if a data record associated with an identifier contains the status "sold" or "outside," then the respective item may not be sold. In this way, improperly returned items from the store may not be sold.

Although various examples of implementations have been described above, it should be understood that many other examples exist. For instance, it should be understood that techniques will typically exist for enabling proper returns of items for re-sale within the same store, under defined conditions. For example, when an item is returned, store personnel may check the item to make sure that it has not been opened or otherwise tampered with. If this is the case, then a data record associated with the item may be changed from "sold" and/or "outside" back to "in-stock," so that the item may legitimately be re-sold within the store.

As another example, most of the scenarios described above describe checking the data record and/or status of an item during a checkout process, or during a return process. However, checking may occur at other times, as well. For example, store personnel may routinely scan store shelves to check whether any items on the shelves currently possess an inappropriate status (e.g., "sold" instead of "in-stock"). This implementation may be useful where, for example, the store suspects that someone will plant an explosive or other inappropriately-modified item back onto the store shelves. In such a case, the maliciously-modified item may never be expected to reach the checkout counter for re-sale, but could easily be checked for within the store by a scanning of the store shelves.

As also described above, a central database may be used to store the data records. In this case, particularly for very large stores that process thousands of items for sale, the data records may only be maintained for some pre-determined amount of time after a sale of the associated items, so as to minimize storage requirements.

Based on the above, items within a store are only sold when intended, and are restricted from being sold when they may have been improperly modified or otherwise manipulated. As a result, stores are prevented from being blackmailed by persons that have manipulated items, so that the stores, as well as the original producers of the items, may be spared expensive lawsuits and negative publicity.

What is claimed is:

1. A method for detecting information about an item to be sold in a store, comprising:
   generating a data record for the item, the data record storing a status of the item, the status corresponding to an in-stock condition when the item is ready for sale;
   checking the data record of the item prior to selling the item;
   outputting an alarm signal when the data record does not reflect the in-stock condition; and
   modifying the data record to indicate a sold status for the item when the item is sold and to indicate an outside status for the item when the item is outside of the store.

2. The method of claim 1, wherein checking the data record comprises:
   checking whether a) the item has a unique identifier that is recognized as being associated with the data record, or b) the item has not previously been registered as sold in the data record; and
   providing the alarm signal if at least one of conditions a) or b) is false.

3. The method of claim 2, wherein generating the data record comprises:
   modifying the data record to register the item as being delivered to the store and as reflecting the in-stock condition, and
   wherein checking the data records comprises:
   checking whether c) the item is registered as being delivered to the store; and
   providing the alarm signal if at least one of conditions a), b), or c) is false.

4. The method of claim 2, further comprising registering the item at an exit of the store as being outside the store.

5. The method of claim 4, wherein checking the data record comprises checking the data record to determine that the in-stock condition is not present.

6. The method of claim 1, wherein checking the data record comprises checking the data record during a checkout process to determine whether a) the item has an identifier that is associated with the data record, b) the item is not registered in the data record as sold, or c) the item is registered as being delivered to the store.

7. The method of claim 1, wherein generating or modifying the data record comprises writing a status of the item to the data record.

8. The method of claim 7 wherein writing the status comprises providing encryption for data written to the data record.

9. The method of claim 1, wherein generating or modifying the data record comprises storing the data record, including a status of the item and a unique identification corresponding to the item, within a central database.

10. The method of claim 9, further comprising:
determining from the central database whether the item has not been registered as sold, the item is registered as being delivered, or the item is registered as being outside the store using the unique identification.

11. A system for detecting information about an item to be sold in a store, comprising:
a classifier that is operable to generate a data record corresponding to the item the data record storing a status of the item, the status reflecting an in-stock condition when the item is ready for sale;
an interrogator that is operable to check the data record, prior to selling the item; and
a controller in communication with the interrogator and operable to output an alarm signal when the data record does not reflect the in-stock condition, and is further operable to modify the data record to indicate a sold status for the item when the item is sold and to indicate an outside for the item when the item is outside of the store.

12. The system of claim 11, wherein the controller is operable to check whether a) the item has unique identifier that is associated with the data record, or b) the item has not previously been registered as sold in the data record, and the controller is further operable to provide the alarm signal if at least one of conditions a) or b) is false.

13. The system of claim 12, further comprising a first register device that is operable to modify the data record to register the item as being delivered to the store and to reflect the in-stock condition during delivery of the item to the store, wherein the controller is further operable to check whether c) the the item registered as being delivered to the store.

14. The system of claim 13, wherein the controller is positioned proximate to a checkout desk of the store.

15. The system of claim 13, further comprising a second register device that is proximate to an exit of the store and that is operable to modify the data record to register the item as being outside the store.

16. The system of claim 15, wherein the controller is in communication with a third register that is proximate to an entrance to the store, and is operable to check whether the item is registered as being sold or being outside the store.

17. The system of claim 11, wherein the classifier is operable to write the status of the item to the data record.

18. The system of claim 17, wherein the classifier is operable to write the status using encrypted data.

19. The system of claim 11, further comprising a central database that is operable to store the data record, including the status unique identification of the item.

20. The system of claim 19, wherein the controller is operable to determine from the central database whether the item has not been registered as sold, the item is registered as being delivered, and/or the item is registered as being outside the store.

21. A computer program product for detecting information about an item to be sold in a store, the computer program product comprising instructions operable to cause a processor to:
generate a data record for the item, the data record storing a status of the item, the status corresponding to an in-stock condition when the item is ready for sale;
check the data record of the item prior to selling the item;
output an alarm signal when the data record does not reflect the in-stock condition; and
modify the data record to indicate a sold status for the item when the item is sold and to indicate an outside status for the item when the item is outside of the store.

22. The computer program product of claim 21, further comprising instructions operable to cause a processor to:
check whether a) the item has a unique identifier that is recognized as being associated with the data record, or b) the has not previously been registered as sold in the data record; and
provide an alarm signal if at least one of the conditions a) or b) is false.

23. The computer program product of claim 22, further comprising instructions operable to cause a processor to:
modify the data record to register the item as being delivered to the store and as reflecting the in-stock condition;
check whether c) the item is registered as being delivered to the store; and
provide an alarm signal if at least one of conditions a), b), or c) is false.

24. The computer program product of claim 21, further comprising instructions operable to cause a processor to check whether the item has a unique identifier, the item has not been registered as sold, and/or the item is registered as being delivered to the.

25. The computer program product of claim 21, further comprising instructions operable to cause a processor to register the item as being outside the store at an exit of the store.

26. The computer program product of claim 25, further comprising instructions operable to cause a processor to check whether the item is registered as being sold or being outside the store at an entrance to the store.

27. The computer program product of claim 21, further comprising instructions operable to cause a processor to register the item as being delivered to the store, as being sold, and/or being outside the store by writing status data to the data record.

28. The computer program product of claim 27, further comprising instructions operable to cause a processor to provide encryption for data written to the data record.

29. The computer program product of claim 21, further comprising instructions operable to cause a processor to interrogate a unique identification device associated with the item.

30. The computer program product of claim 21, further comprising instructions operable to cause a processor to register the item as being delivered to the store, as being sold, and/or being outside the store by storing the status together with a unique identification within a central database.

31. The computer program product of claim 30, further comprising instructions operable to cause a processor to determine from the central database using the unique identification of the item whether the item has not been registered as sold, the item is registered as being delivered, and/or the item is registered as being outside the store.

* * * * *